(12) United States Patent
Alghooneh et al.

(10) Patent No.: US 10,339,770 B2
(45) Date of Patent: Jul. 2, 2019

(54) HAPTIC ENABLED STRAP FOR WEARABLE ELECTRONIC DEVICE

(71) Applicant: IMMERSION CORPORATION, San Jose, CA (US)

(72) Inventors: Mansoor Alghooneh, Montreal (CA); Juan Manuel Cruz-Hernandez, Montreal (CA); Jamal Saboune, Montreal (CA); Vahid Khoshkava, Montreal (CA)

(73) Assignee: IMMERSION CORPORATION, San Jose, CA (US)

( * ) Notice: Subject to any disclaimer, the term of this patent is extended or adjusted under 35 U.S.C. 154(b) by 0 days.

(21) Appl. No.: 15/047,162

(22) Filed: Feb. 18, 2016

(65) Prior Publication Data
US 2017/0243451 A1    Aug. 24, 2017

(51) Int. Cl.
*B60Q 1/00*    (2006.01)
*G08B 6/00*    (2006.01)
*G06F 1/16*    (2006.01)
*G06F 3/01*    (2006.01)
*G04G 21/00*   (2010.01)

(52) U.S. Cl.
CPC ............... *G08B 6/00* (2013.01); *G04G 21/00* (2013.01); *G06F 1/163* (2013.01); *G06F 3/016* (2013.01)

(58) Field of Classification Search
None
See application file for complete search history.

(56) References Cited

U.S. PATENT DOCUMENTS

| | | | |
|---|---|---|---|
| 8,787,006 B2 | 7/2014 | Golko et al. | |
| 9,134,834 B2 | 9/2015 | Reshef | |
| 9,501,147 B2 * | 11/2016 | Heubel | G06F 3/016 |
| 9,612,661 B2 * | 4/2017 | Wagner | G06F 3/016 |
| 2014/0180582 A1 | 6/2014 | Pontarelli et al. | |
| 2015/0253848 A1 | 9/2015 | Heubel et al. | |
| 2015/0277563 A1 | 10/2015 | Huang et al. | |
| 2015/0356889 A1 | 12/2015 | Schwartz | |
| 2016/0023245 A1 | 1/2016 | Zadesky et al. | |
| 2016/0255944 A1 * | 9/2016 | Baranski | A44C 5/0069 |
| 2018/0214656 A1 * | 8/2018 | McLaren | A61M 16/06 |

FOREIGN PATENT DOCUMENTS

WO    2015/047356 A1    4/2015

OTHER PUBLICATIONS

*The Haptic Wristband*, <http://hapticwristband.com>, Retrieved from the Internet on Jan. 27, 2016.
Szondy, D., "Modillion turns any "dumb" watch into a Smartwatch," May 14, 2014.
Extended European Search Report, dated Jun. 19, 2017, EP Application No. 17156132.7, 7 pages.

* cited by examiner

*Primary Examiner* — Adolf Dsouza
(74) *Attorney, Agent, or Firm* — Miles & Stockbridge P.C.

(57) ABSTRACT

A system includes a wearable electronic device and a strap operatively connected to the wearable electronic device. The strap is configured to allow a user to wear the wearable electronic device on a body part. The system also includes an actuator connected to the strap, and a processor in signal communication with the wearable electronic device and the actuator. The processor is configured to receive a first signal from the wearable electronic device and send a second signal, based on the first signal, to the actuator to cause the strap to move relative to the wearable electronic device and provide a haptic effect to the user.

20 Claims, 9 Drawing Sheets

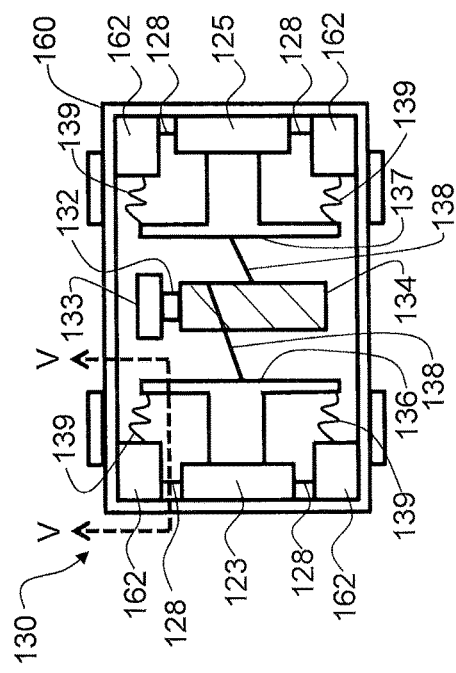

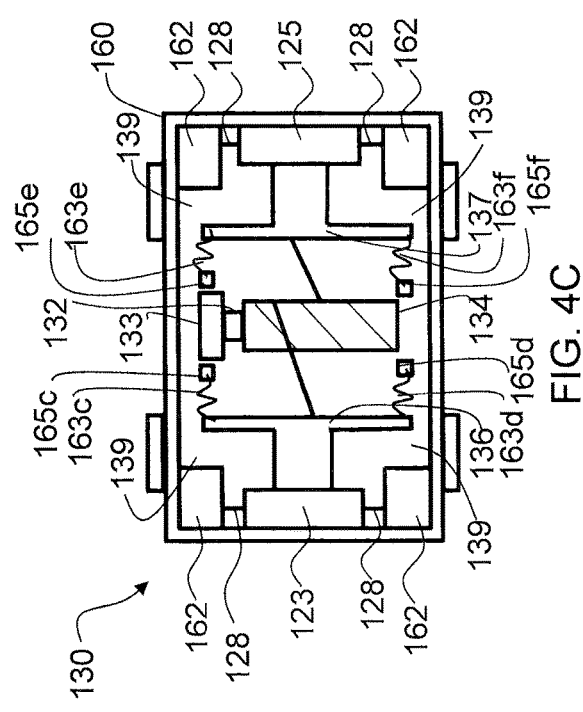
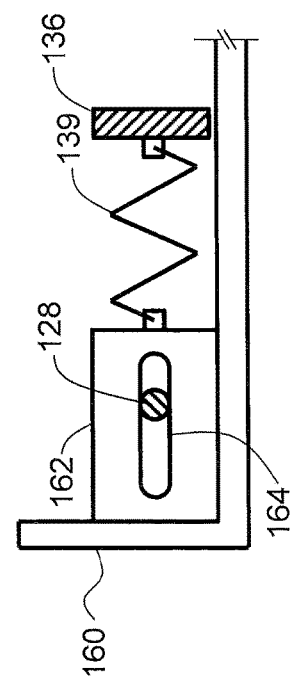

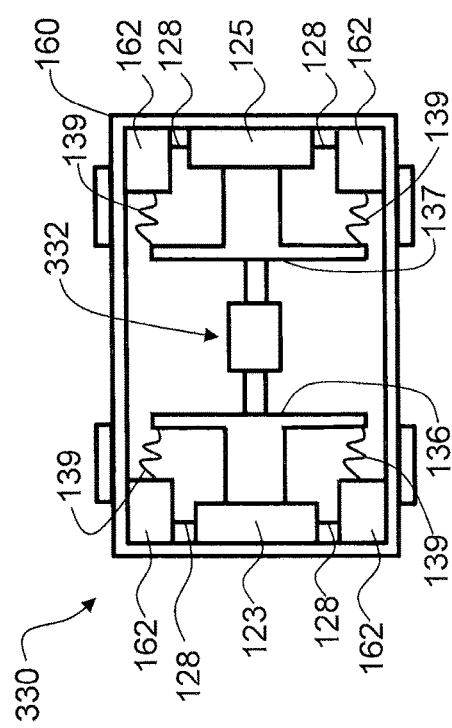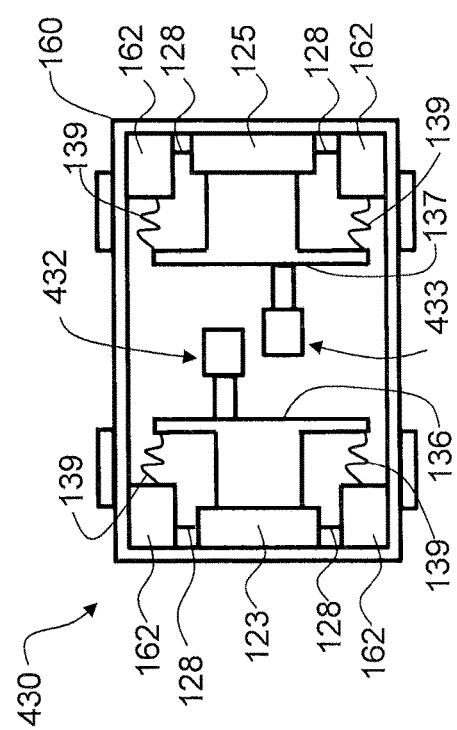

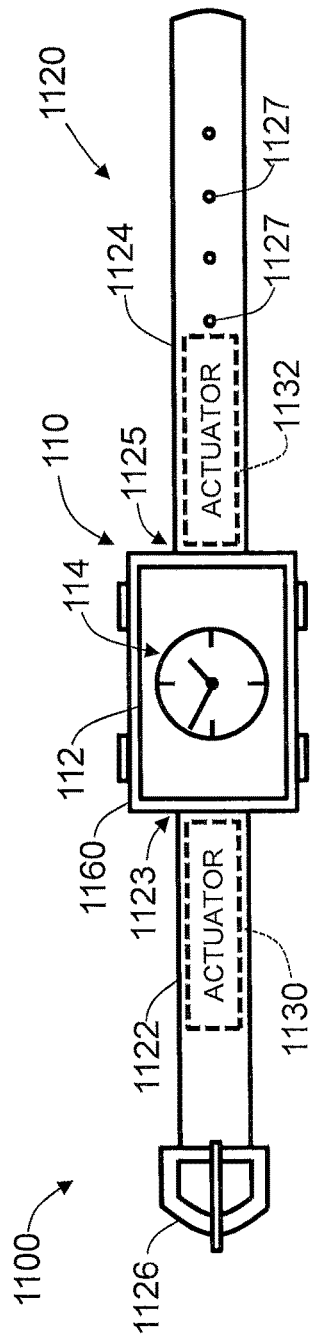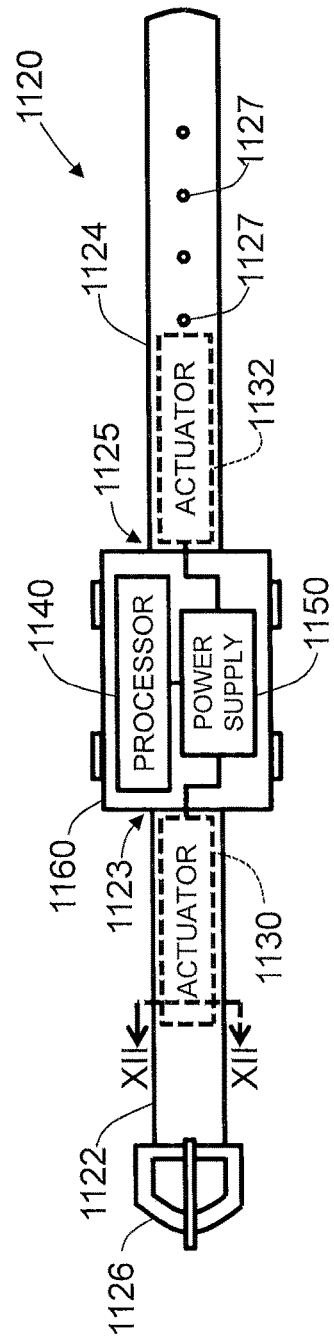

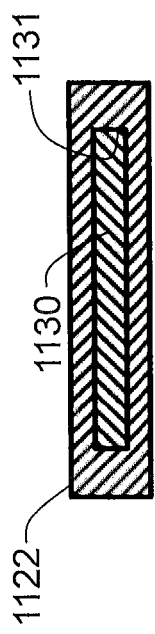
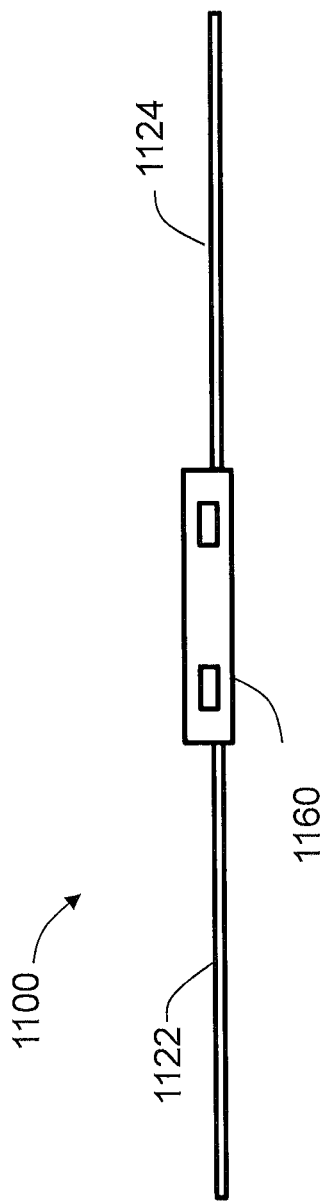
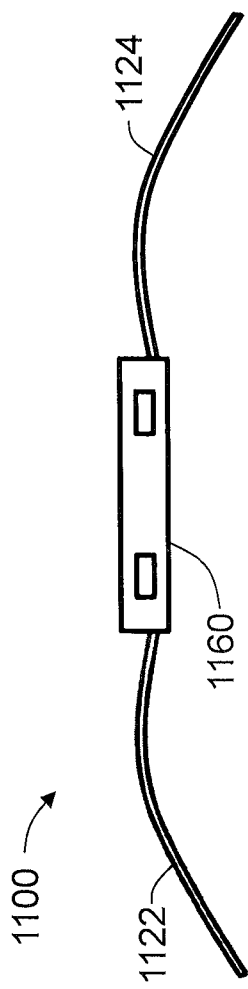
FIG. 12
FIG. 13
FIG. 14

HAPTIC ENABLED STRAP FOR WEARABLE ELECTRONIC DEVICE

FIELD

The present invention is direct to a haptic enabled strap for a wearable electronic device.

BACKGROUND

Wearable electronic devices that provide haptic effects, such as vibrations, typically include Eccentric Rotating Mass motors (ERMs) that use low power for actuation and provide high frequency vibrotactile stimuli. Such devices may be limited in the types of haptic effects that can be generated to a user of the wearable electronic device. In order for the user to perceive the vibrotactile stimuli, the user's skin should be in touch with the case of the wearable electronic device that houses the ERM. If the wearable electronic device is a watch, and the straps of the watch are loose, the user may not be able to perceive any vibrations that are generated by the ERM. In addition, the vibrations may be limited in the information that can be provided to the user. For example, with a single ERM, the vibrations generated by the ERM cannot convey directional information through a haptic sensation.

SUMMARY

It is desirable to generate non-vibration haptic effects and sensations to the user of a wearable electronic device that can convey additional information to the user, while still using low power.

It is an aspect of the present invention to provide a system that includes a wearable electronic device and a strap operatively connected to the wearable electronic device. The strap is configured to allow a user to wear the wearable electronic device on a body part. The system also includes an actuator connected to the strap, and a processor in signal communication with the wearable electronic device and the actuator. The processor is configured to receive a first signal from the wearable electronic device and send a second signal, based on the first signal, to the actuator to cause the strap to move relative to the wearable electronic device and provide a haptic effect to the user.

In an embodiment, the actuator includes a motor operatively connected to a first end of the strap.

In an embodiment, the motor is operatively connected to a second end of the strap.

In an embodiment, the actuator includes a second motor operatively connected to a second end of the strap.

In an embodiment, the actuator includes a linear actuator operatively connected to a first end of the strap.

In an embodiment, the actuator includes a second linear actuator operatively connected to a second end of the strap.

In an embodiment, the actuator includes a smart material.

In an embodiment, the smart material is embedded in the strap.

In an embodiment, the smart material is selected from the group consisting of: a macro-fiber composite, an electroactive polymer, an electrorheological fluid and a magnetorheological fluid.

In an embodiment, the wearable electronic device is a smart watch.

It is an aspect of the present invention to provide a method that includes receiving a first signal from a wearable electronic device with a processor, generating a second signal based on the first signal with the processor, receiving the second signal generated by the processor with an actuator, and moving a strap operatively connected to the wearable electronic device relative to the wearable electronic device with the actuator to provide a haptic effect to a user of the wearable electronic device.

In an embodiment, moving the strap includes moving a first end of the strap with the actuator. In an embodiment, moving the strap also includes moving a second end of the strap with the actuator.

In an embodiment, the first end of the strap and the second end of the strap are moved simultaneously.

In an embodiment, the first end of the strap and the second end of the strap are moved independently.

It is an aspect of the present invention to provide a non-transitory computer readable medium having instructions stored thereon, that when executed by a processor, causes the processor to perform a method that includes receiving a first signal from a wearable electronic device with the processor; generating a second signal based on the first signal; receiving the second signal generated by the processor with an actuator; and moving a strap operatively connected to the wearable electronic device relative to the wearable electronic device with the actuator to provide a haptic effect to a user of the wearable electronic device.

These and other aspects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The components of the following Figures are illustrated to emphasize the general principles of the present disclosure and are not necessarily drawn to scale. Reference characters designating corresponding components are repeated as necessary throughout the Figures for the sake of consistency and clarity.

FIGS. 4A, 4B, and 4C are more detailed schematic views of embodiments of an actuator within a housing of the system of FIG. 3;

FIG. 5 is a schematic cross-sectional view taken along line V-V in FIG. 4A;

FIG. 7 is a detailed schematic view of an embodiment of the actuator of FIG. 1;

FIG. 8 is a detailed schematic view of an embodiment of the actuator of FIG. 1;

FIG. 10 is a schematic top view of an embodiment of the system of FIG. 1;

FIG. 11 is a schematic top view of the system of FIG. 10 with a wearable electronic device removed;

FIG. 12 is a cross-sectional view taken along line XII-XII in FIG. 11;

FIG. 13 is a schematic side view of the system of FIG. 10 with a strap of the system in a first position; and FIG. 14 is a schematic side view of the system of FIG. 13 with the strap of the system in a second position.

DETAILED DESCRIPTION

Figure 1:
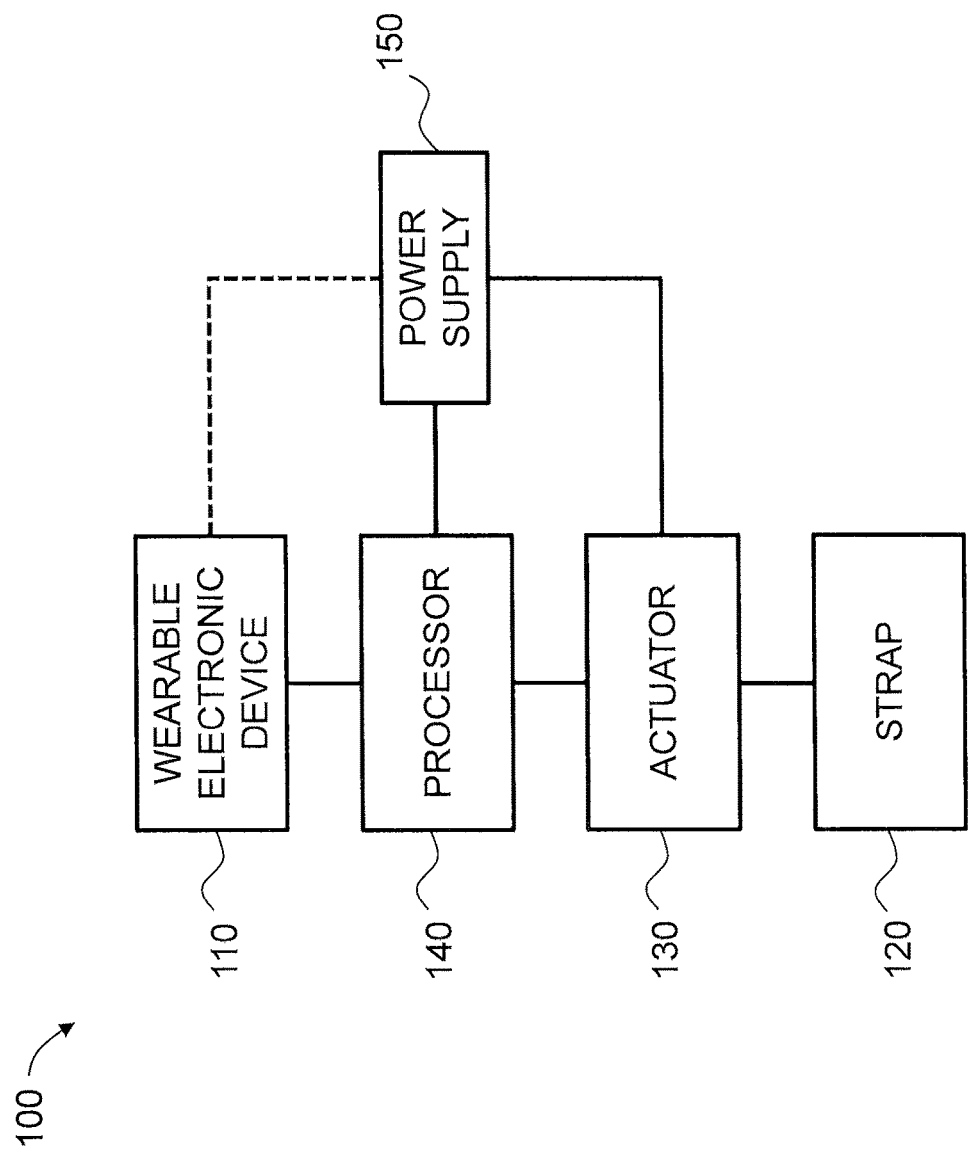
FIG. 1 schematically illustrates a system in accordance with embodiments of the invention.

FIG. 1 schematically illustrates a system 100 configured to be worn by a user on a body part, in accordance with embodiments of the invention. As illustrated, the system 100 includes a wearable electronic device 110 and a strap 120 operatively connected to the wearable electronic device 110 so that the wearable electronic device 110 may be worn by a user of the system 100. The system 100 also includes an actuator 130 operatively connected to the strap 120, a processor 140 in signal communication with the actuator 130 and the wearable electronic device 110, and a power supply 150 configured to provide power to the actuator 130 and the processor 140. The power supply 150 may also be configured to provide power to the wearable electronic device 110, as represented by the dashed line in FIG. 1.

The wearable electronic device 110 may be a smart watch, a fitness tracker, or any other electronic device that is configured to be worn by a user of the wearable electronic device 110 via the strap 120. In the illustrated embodiment, the wearable electronic device 110 is a smart watch configured to be worn by a user on a wrist or arm. In an embodiment, the processor 140 and the power supply 150 may be part of the wearable electronic device 110. In an embodiment, the actuator 130 may also be part of the wearable electronic device 110.

A bus and/or communications network may be configured to allow signal communication between the various components of the system 100 and also to access information from remote computers or servers through another communications network. The communications network may include one or more of a wireless communications network, an Internet, a personal area network ("PAN"), a local area network ("LAN"), a metropolitan area network ("MAN"), a wide area network ("WAN"), etc. The communications network may include local radio frequencies, cellular (GPRS, CDMA, GSM, CDPD, 2.5G, 3G, 4G LTE, etc.), Ultra-WideBand ("UWB"), WiMax, ZigBee, and/or other ad-hoc/mesh wireless network technologies, etc.

Figure 2:
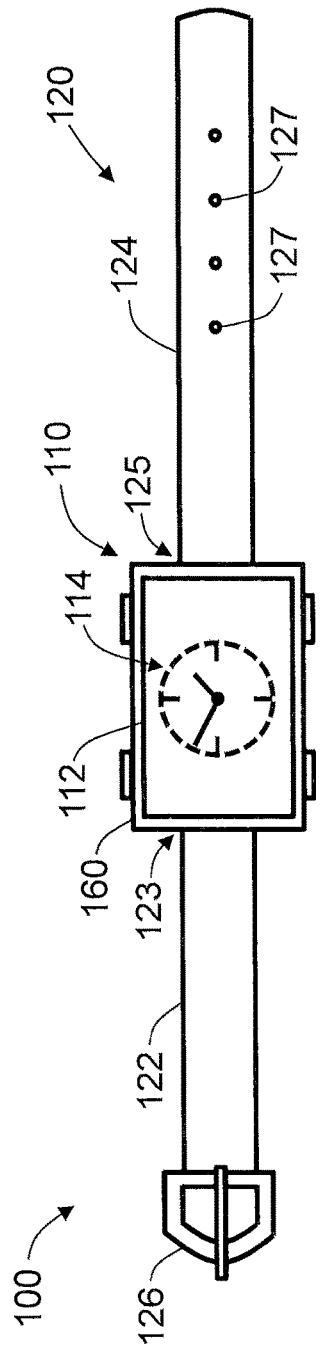
FIG. 2 is a schematic top view of an embodiment of the system of FIG. 1.

As illustrated in FIG. 2, the wearable electronic device 110 includes a housing 112 configured to hold the electronics of the wearable electronic device 110. The wearable electronic device 110 may, in some embodiments, support a display 114 of the wearable electronic device 110 and, in other embodiments, the wearable electronic device 110 may be a wristband or bracelet without a display. In the illustrated embodiment, the system 100 includes a separate housing 160 configured to hold the wearable electronic device 110. In an embodiment, the separate housing 160 may not be needed, and the housing 112 of the wearable electronic device 110 may be the only housing within the system 100. The illustrated embodiment is not intended to be limiting in any way and in other embodiments of the invention, the system 100 may be configured to be worn on other user body parts, such as a finger, a torso, a leg, a head, etc.

The strap 120 is operatively connected to the wearable electronic device 110 via the housing 160. In the illustrated embodiment, the strap 120 includes a first part 122 having a first end 123 operatively connected to one portion of the wearable electronic device 110, and a second part 124 having a second end 125 operatively connected to another portion of the wearable electronic device 110. In an embodiment, the strap 120 may be a single piece having the first end 123 at one end of the single piece and the second end 125 at the other end of the single piece. The illustrated embodiment is not intended to be limiting in any way. As illustrated in FIG. 2, the strap 120 includes a buckle 126 connected to an opposite end of the first part 122 as the first end 123, and a plurality of apertures 127 in the second part 124 so that the first part 122 may be connected to the second part 124, as is common with two-piece straps used for conventional watches or belts.

Figure 3:
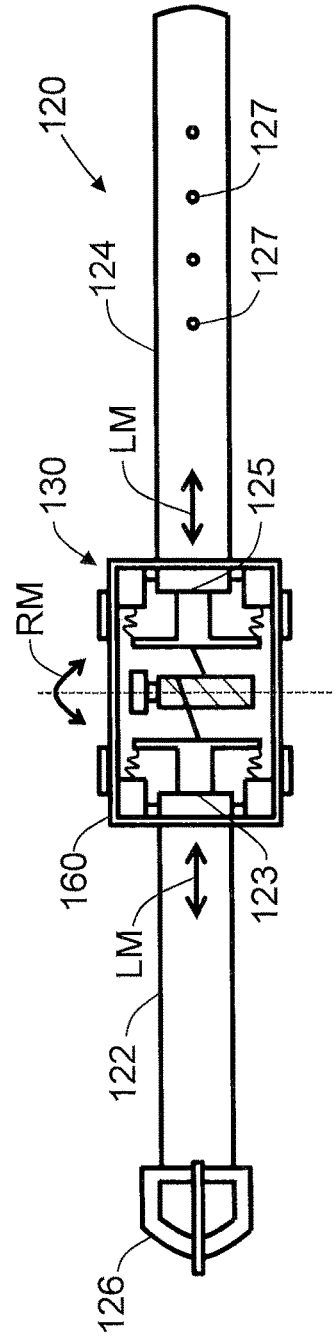
FIG. 3 is a schematic top view of the embodiment of the system of FIG. 2 with a wearable electronic device removed.

FIG. 3 illustrates the system 100 of FIG. 2 with the wearable electronic device 110 removed. As illustrated, the actuator 130 is supported by the housing 160 and connected to the strap 120. FIG. 4A is a more detailed view of the actuator 130 in the housing 160. The housing 160 includes a plurality of holders 162 or mounting structures configured to support the first end 123 of the first part 122 of the strap 120 and the second end 125 of the second part 124 of the strap 120 via a pair of pins 128 held by or connected to the first end 123 and the second end 125. As illustrated in FIG. 5, each of the plurality of holders 162 includes a guide 164, which may be in the form of a slot that is configured to receive one end of one of the pins 128 such that when the first end 123 of the first part 122 of the strap 120 and the second end 125 of the second part 124 of the strap 120 are placed in the housing 160, the strap 120 is operatively connected to the housing 160 at each end 123, 125 via the pins 128. In some embodiments, the guide 164 may be substantially linear, as illustrated in FIG. 5. In other embodiments (not shown), the guide 164 may be curved (e.g. arced). Each end 123, 125 of the strap 120 may be slid relative to the housing 160 via movement of the pins 128 in the guides 164. The lengths of the guides 164 will determine the range of movement of the first part 122 and the second part 124 of the strap 120. In an embodiment, the length of each guide 134 may be up to about 10 mm.

As illustrated in FIG. 4A, the actuator 130 includes a motor 132, such as a DC motor, that is connected to the housing 160 via a mount 133. A first transmission part 134 in the form of a cylindrical gearbox is mounted to a shaft of the motor 132 and rotates when the motor 132 is energized and the shaft of the motor 132 rotates in either a first direction or a second direction, as indicated by the double arrow RM in FIG. 3. The motor 132 may be mounted inside the first transmission part 134. A second transmission part 136 is connected to the first end 123 of the strap 120, and a third transmission part 137 is connected to the second end 125 of the strap, as illustrated.

In some embodiments, another portion of the second transmission part 136 may be operatively connected to the housing 160 via two resilient members 139 positioned between the second transmission part 136 and two of the holders 162. Each resilient member 139 may be a return spring or any type of mechanism that acts as a return spring. Similarly, another portion of the third transmission part 137 may be, in these embodiments, operatively connected to the housing 160 via two resilient members 139 positioned between the third transmission part 137 and two of the holders 162, as illustrated in FIG. 4A. In other embodiments, the second transmission part 136 may be operatively connected from a central region to an anchor part 165a, which may be affixed to the housing 160, via a resilient member 163a, as illustrated in FIG. 4B. Similarly, the third transmission part 137 may be, in these latter embodiments, operatively connected from a central region to an anchor part 165b via a resilient member 163b, as illustrated in FIG. 4B. In still other embodiments, the second transmission part 136 and the third transmission part 137 may each be operatively and respectively connected from side regions to two anchor parts 165c-f, which may be affixed to the housing 160, via two resilient members 163c-f, as illustrated in FIG. 4C. Each resilient member 163 may be a compression spring or any type of mechanism that acts as a compression spring.

The first transmission part 134 is connected to each of the second transmission part 136 and the third transmission part 137 via a cable 138, such as a thin and strong wire (e.g. fishing line or steel wire), which may be wrapped around a helical guide on an outer surface of the first transmission part 134. When the motor 132 is energized and rotates the first transmission part 134 in a first direction, the first end 123 and the second end 125 of the strap 120 may move towards each other via the second transmission part 136 and the third transmission part 137. As the first transmission part 134 rotates, the cables 138 may be wound onto the first transmission part 134, which moves each of the second transmission part 136 and the third transmission part 137 towards the first transmission part 134, which moves the first end 123 and the second end 125 of the strap 120 towards each other. When the motor 132 is no longer energized, i.e. turned off, the resilient members 139 may push the second transmission part 136 and the third transmission part 137 back to their respective default (rest) positions, and the first transmission part 134 may rotate back to its default (rest position), to move the first end 123 and the second end 125 of the strap 120 back to their default positions. As a result of the movement of the first end 123 and the second end 125 of the strap 120, which is represented by the double straight arrows LM in FIG. 3, the user may feel the first part 122 and the second part 124 of the strap 120 rub against his/her skin, i.e. a haptic effect. In other words, the rotational motion RM of the first transmission part 134 generated by the motor 132 translates to linear movement LM of the first part 122 and the second part 124 of the strap 120, which is felt by the user as a haptic effect.

Figure 6:
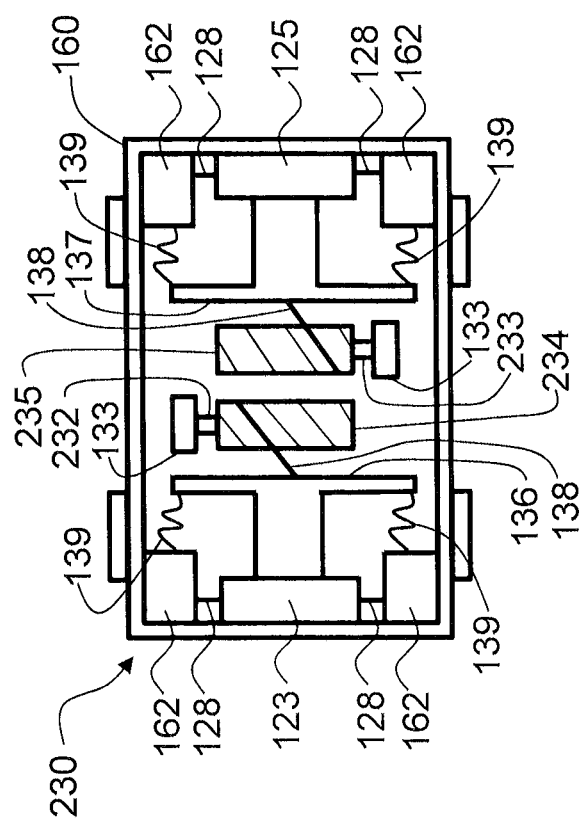
FIG. 6 is a detailed schematic view of an embodiment of the actuator of FIG. 1.

FIG. 6 illustrates an embodiment of an actuator 230 of the system that includes two motors 232, 233 and two first transmission parts 234, 235, with one motor and one first transmission part dedicated to each of the ends 123, 125 of the strap 120, so that the first part 122 and the second part 124 of the strap 120 may be moved independently from each other. Such independent control may allow for directional information to be conveyed to the user. For example, by energizing only one of the motors, such as motor 232, which rotates the first transmission part 234 to push or pull the second transmission part 136, only the first end 123 of the first part 122 of the strap 120 will move and the user may feel as if he/she was pushed or pulled from the side associated with the first part 122 of the strap 120 and thus move in the direction of the motion.

In an embodiment, the first transmission part 134, the second transmission part 136 and the third transmission part 137 may be replaced by a single transmission system that includes a coiled wire fixed to each respective end 123, 125 of the strap 120 on one end and to the shaft of the motor 132 on the other end. When twisted in one direction by the shaft rotation effect, the wire may shrink/retract and as a result pull the respective end 123, 125 of the strap 120. When twisted in the other direction, the wire may relax and be allowed to push the respective end 123, 125 of the strap 120 back to its default position. Adding a resilient member to the mechanism may also help reduce the load on the coiled wire when pushing back the respective end 123, 125 of the strap 120.

In an embodiment, a pair of gear motors may be mounted within the housing 160 and configured to each receive an end 123, 125 of the strap such that each part 122, 124 of the strap may be rolled on the gear motor directly through a cylindrical transmission mechanism.

FIG. 7 illustrates an embodiment of an actuator 330 of the system that includes a linear actuator 332 configured to pull/push the first end 123 and the second end 125 of the strap 120 directly through the second transmission part 136 and the third transmission part 137, respectively, by retracting/extending two stems of the linear actuator 332. In another embodiment, not illustrated, the linear actuator 332 may be configured to have only one stem rather than two stems. In such an embodiment, the linear actuator 332 may pull/push one of the first end 123 or the second end 125 of the strap 120 through one of the second transmission part 136 or the third transmission part 137, respectively, by retracting/extending the singular stem of the linear actuator 332. For example, in such an embodiment, if the actuator 332 were to pull in on one of the ends then this would cause the other end to be pushed out.

FIG. 8 illustrates an embodiment of an actuator 430 of the system that includes two linear actuators 432, 433, with one linear actuator 432, 433 dedicated to each end 123, 125 of the strap 120. The embodiment illustrated in FIG. 8 is similar to the embodiment illustrated in FIG. 6 in that the first part 122 of the strap 120 and the second part 124 of the strap 120 may be independently controlled so that directional haptic effects may be provided to the user. In an embodiment, the resilient members 139 may be used to help reduce the load on the linear actuator(s) 332, 432, 433 when moving the first end 123 and the second end 125 of the strap 120 back to their default positions. The ranges of motions of the first end 123 and the second end 125 of the strap 120 may be determined by the length of the stroke of the linear actuators 332, 432, 433. In the embodiments illustrated in FIGS. 7 and 8, the resilient members 139 may not be included and the linear actuators 332, 432, 433 may control the positions of the first end 123 and the second end 125 of the straps. The illustrated embodiments are not intended to be limiting in any way.

The processor 140 may be part of the wearable electronic device 110 or may be a separate processor mounted in the housing 160. The processor 140 is configured to execute programs that send signals to the actuators 130, 230, 330, 430 to control the speed and direction of the motor(s) 132, 232, 233 and the linear actuator(s) 332, 432, 433. The processor 140 may be a general-purpose or specific-purpose processor or microcontroller for managing or controlling the operations and functions of the system 100. For example, the processor 140 may be specifically designed as an application-specific integrated circuit ("ASIC") to control output signals to the actuators 130, 230, 330, 430 to provide haptic feedback or effects to the user. The processor 140 may be configured to decide, based on predefined factors, what haptic feedback or effects are to be generated based on a haptic control signal received or determined by the processor 140, the order in which the haptic effects are generated, and the magnitude, frequency, duration, and/or other parameters of the haptic effects. The processor 140 may also be configured to provide streaming commands that can be used to drive the actuators 130, 230, 330, 430 for providing a particular haptic effect. As noted above, the processor 140 may be part of the wearable electronic device 110 or may be separate from the wearable electronic device 110 and mounted separately in the housing 160. In some embodiments, more than one processor may be included in the system 100, with each processor configured to perform certain functions within the system 100.

Figure 9:
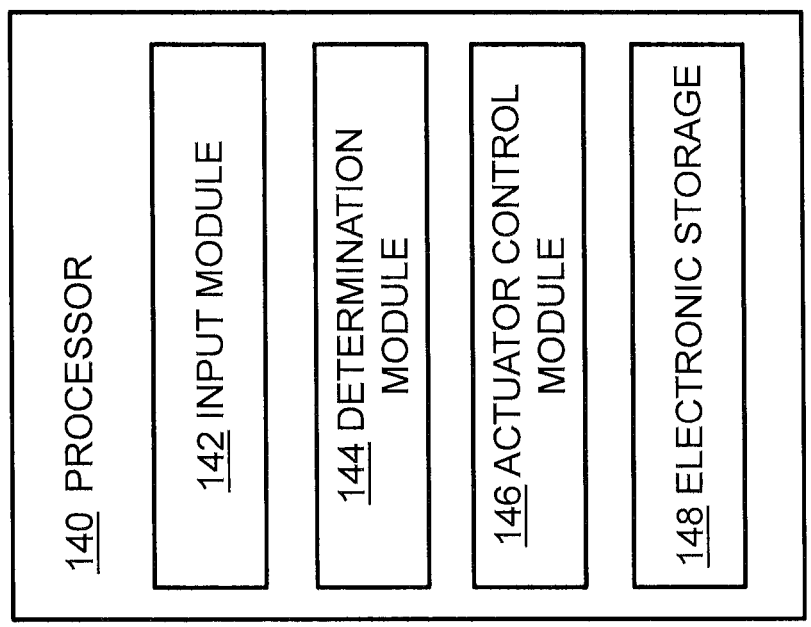
FIG. 9 schematically illustrates an embodiment of a processor of FIG. 1.

FIG. 9 schematically illustrates an embodiment of the processor 140 in more detail. The processor 140 may be configured to execute one or more computer program modules. The one or more computer program modules may include one or more of an input module 142, a determination module 144, an actuator control module 146, and/or other modules. The processor 140 may also include electronic storage 148 or a memory device (also referred to as non-transitory computer readable medium). The processor 140 may be configured to execute the modules 142, 144 and/or 146 by software, hardware, firmware, some combination of software, hardware, and/or firmware, and/or other mechanisms for configuring processing capabilities on processor 140. The non-transitory computer readable medium may have instructions stored thereon, that when executed by the processor, causes the processor to perform the method according to an embodiment of the invention.

It should be appreciated that although modules 142, 144 and 146 are illustrated in FIG. 9 as being co-located within a single processing unit, in embodiments in which the system includes multiple processors, one or more of modules 142, 144 and/or 146 may be located remotely from the other modules. The description of the functionality provided by the different modules 142, 144 and/or 146 described below is for illustrative purposes, and is not intended to be limiting, as any of the modules 142, 144 and/or 146 may provide more or less functionality than is described. For example, one or more of the modules 142, 144 and/or 146 may be eliminated, and some or all of its functionality may be provided by other ones of the modules 142, 144 and/or 146. As another example, the processor 140 may be configured to execute one or more additional modules that may perform some or all of the functionality attributed below to one of the modules 142, 144 and/or 146.

The input module 142 is configured or programmed to receive an input signal from the wearable electronic device 110 and/or electronic devices that are external to the system 100, such as a remote computer, server, smart phone, GPS device, etc. The input signal conveys information relating to an event, such as the receipt of an e-mail or a text message, or a command from a GPS device indicating that a direction needs to be changed, for example.

The determination module 144 is configured or programmed to determine what type of action is to be taken by the system 100 according to the signal received from the input module 142, and what type of haptic feedback is to be generated by the actuator 130. The determination module 144 may be programmed with a library of input signal and function information that is available to the system 100 and corresponding haptic effect, if any, so that the determination module 144 may determine a corresponding output. The determination module 144 may output a signal to the actuator control module 146 so that a suitable haptic effect may be provided to the user. For example, the wearable electronic device 110 may generate a notification upon receipt of a new text message or e-mail that has been received, and the haptic effect may correspond to the notification.

The actuator control module 146 is configured or programmed to determine a haptic control signal to output to the actuator 130, based on the signal generated by the determination module 146. Determining the haptic control signal may include determining one or more parameters that include a magnitude, duration, frequency, etc., of the haptic feedback that will be generated by the actuator 140 to provide the desired effect to the user, based on all inputs to the system 100. Desired effects may include pushing and pulling (rubbing) the strap 120 against the skin of the user in different patterns and speeds. By independently controlling the speed, magnitude and direction of movement of the ends 123, 125 of the strap, different directional effects and patterns may be created to convey different messages to the user through differently perceived effects.

The power supply 150 may be any suitable power supply that can energize to the actuator 130 and the processor 140. The design of the actuator 130 is intended to have low power consumption.

In an implementation of embodiments of the invention, a user of the system 100 may receive a message on his/her phone that is wirelessly connected to his/her wrist wearable electronic device 110. The system 100 may deliver a haptic notification to the user by pulling/pushing the first end 123 and/or the second end 125 of the strap 120 quickly, three times in a row, for example.

In an implementation of embodiments of the invention, a user of the system 100 may try to find a new address using a map on his/her smart watch. The strap 120 of the system 100 may guide the user to the right or left direction by rubbing against his/her skin so that he/she does not need to continuously look at the smart watch to find the address while walking.

Different haptic experiences (i.e. squeezing and rubbing) may be delivered by modifying the speed and direction of the actuator(s). A squeeze effect may be defined by a large decrease in the strap 120 circumference in a way that most of the strap 120 is in contact with the skin of the user's wrist. The area of contact of the strap 120 to the wrist skin should stay in contact with the skin for a relatively long time (e.g. >100 ms). A squeeze is not delivered with a frequency greater than 5 Hz, for example. As for the actuator control, a squeeze should have the actuator pull both ends 123, 125 of the strap 120 as tight as possible, without annoying or providing discomfort to the user, and to maintain the strap 120 tight for the designated contact time (i.e. 100 ms).

A strap rubbing experience may be defined by a smaller decrease of the circumference, as compared to that of a squeeze effect, and by moving the contact area between the parts 122, 124 of the strap 120 and the wrist back and forth in a fast manner. This may be achieved through fast and small displacements of the ends 123, 125 of the strap in push and pull directions. For example, the motor(s) 132, 232, 233 of the actuator may be activated for very short periods of time (e.g. 20 ms), alternating clockwise and counterclockwise rotations, which translates into alternating push and pull actions of the parts 122, 124 of the strap 120. The rubbing haptic sensation may be delivered at a higher frequency (e.g. 20 Hz) than that of the squeezing haptic sensation.

The squeezing and rubbing haptic sensations may generate each other. For example, if the strap 120 is worn tight by a user, a rubbing sensation may generate a light brief squeeze, and a squeezing sensation may create a rubbing effect that is slower and with a bigger contact area.

FIGS. 10-13 illustrate a system 1100 in accordance with an embodiment of the invention. As illustrated, the system 1100 includes the wearable electronic device 110 described above that is held by a housing 1160, and a strap 1120. The strap 120 is operatively connected to the wearable electronic device 110 via the housing 1160. In the illustrated embodiment, the strap 1120 includes a first part 1122 having a first end 1123 operatively connected to one portion of the wearable electronic device 110, and a second part 1124 having a second end 1125 operatively connected to another portion of the wearable electronic device 110. In an embodiment, the strap 1120 may be a single piece having the first end 1123 at one end of the single piece and the second end 1125 at the other end of the single piece. The illustrated embodiment is not intended to be limiting in any way. As illustrated in FIGS. 10 and 11, the strap 120 includes a buckle 1126 connected to an opposite end of the first part 1122 as the first end 1123, and a plurality of apertures 1127 in the second part 1124 so that the first part 1122 may be connected to the second part 1124, as is common with two-piece straps used for conventional watches or belts.

In the illustrated embodiment, the first part 1122 of the strap 1120 includes a first actuator 1130, and the second part 1124 of the strap 1120 includes a second actuator 1132. Each of the actuators 1130, 1132 may be embedded in its respective part 1122, 1124 of the strap 1120 or may be attached to outside surfaces of the strap 1120. In the illustrated embodiment, the actuators 1130, 1132 are embedded in their respective parts 1122, 1124 of the strap. FIG. 12 is a cross-sectional view of the first part 1122 of the strap 1120 taken along line XII-XII in FIG. 11. As illustrated, the first part 1122 of the strap includes a cavity 1131 that holds the actuator 1130. The actuators 1130, 1132 are configured to deform when a positive or negative voltage is applied to the actuators 1130, 1132 by a power supply 1150 located within the housing 1160 of the system 1110. In an embodiment, the actuators 1130, 1132 include so-called "smart materials", such as macro-fiber composites (MFCs), electro-active polymers (EAPs), electrorheological fluids (ERFs) and magnetorheological fluids (MRFs). However, it will be appreciated that any type of haptic actuator could also be used in other embodiments of the invention. For example, in an embodiment, a vibrating motor, such as a coin ERM (Eccentric Rotating Mass) motor, a piezoelectric actuator or an EAP (electroactive polymer) actuator in resonant mode, could also be used for actuators 1130 and/or 1132.

The cavity 1131 may be designed such that macro-fiber composites and electroactive polymers can be epoxied on a surface of the cavity 1131, or electrorheological and magnetorheological fluids can be contained within the cavity 1131 without leakage. In an embodiment, the parts 1122, 1124 of the strap 1120 that are embedded with the smart materials may be 3D printed as solid-state pieces. It will be appreciated that in other embodiments, the system 1110 may be a wristband or bracelet without a display.

In an embodiment, a patch made from macro-fiber composites may be closely attached to an interior surface (i.e. the surface that contacts the user's skin) or exterior surface of the strap 1120. When a positive or negative voltage is applied to the macro-fiber composite patch, the patch will expand or shrink and as a result, the strap 1120 will bend in one direction or the other. For example, FIG. 13 is a side view of the system 1100 in a rest or default position. When a voltage is applied to the macro-composite fiber patches located in each of the first part 1122 and the second part 1124 of the strap 1120, the patches shrink in a direction along the length of the parts 1122, 1124 of the trap 1120, which causes the parts 1122, 1124 of the strap 1120 to bend, as illustrated in FIG. 14. Because the strap 1120 is in close contact with the user's skin, its movement may be felt by the user in the form of a tap or shear, depending on the actuation frequency, the patch size and the position of the patch.

In an embodiment, a patch made from macro-fiber composites that is embedded inside the cavity 1131 may be covered by a compliant membrane, and be grounded from only a single side. On actuation, the macro-fiber composite patch may bend freely from one side pushing the membrane into contact with the skin, which may feel like a tapping/poking effect or squeeze if two patches are actuated simultaneously from both sides of the wrist.

Depending on the position and size of the macro-fiber composite patch, different types of effects may be created. For example, a bigger rounded macro-fiber composite patch that largely covers the parts 1122, 1124 of the strap 1120 may produce a squeeze effect. A smaller macro-fiber composite patch that is embedded closer to the housing 1160 may cause the strap 1120 to move/shear/tap on expansion/retraction. A macro-fiber composite patch that is placed close to the buckle 1126 may cause the buckle 1126 to move and as a result, touch the user's skin.

Driving the actuator(s) 1130, 1132 with a higher frequency signal (e.g. >50 Hz) may create a vibration effect on the wrist of the user. In an embodiment, the parts 1122, 1124 of the strap 1120 may vibrate to deliver the haptic effect. In an embodiment, the housing 1160 may vibrate as a result of the parts 1122, 1124 of the strap 1120 vibrating. In an embodiment, the housing 1160 may be isolated from the parts 1122, 1124 of the strap 1120, and the parts 1122, 1124 of the strap 1120 may be vibrated independently to convey different notifications/messages to the user.

In an embodiment, the macro-fiber composite patch may be replaced by an electro-active polymer actuator that may bend when a voltage is applied by the power supply 1150 such that the strap 1120 will follow the bending movement of the actuator 1130, similar to the position illustrated in FIG. 14. All of the above-described embodiments of the actuator 1130 that include the macro-fiber composite patch may be replicated using the electro-active polymer actuator.

In an embodiment, electrorheological or magnetorheological fluids may be contained within the cavity 1131 and embedded inside the parts 1122, 1124 of the strap 1120. These types of smart materials may act as a spring, and the stiffness may be modified by applying a voltage to the smart material. Being under stress in the desired configuration, e.g. bent around the wrist, the change in stiffness of the smart material will translate into a change in its shape, such as the smart material relaxing and causing the strap 1120 to straighten. By actuating and controlling the smart material, different haptic sensations may be created.

By providing the separate actuators 1130, 1132 to each part 1122, 1124 of the strap 1120, the first part 1122 and the second part 1124 of the strap 1120 may be actuated independently so that directionality may be provided to the haptic effect. In addition, different messages or notifications may be provided to the user by actuating only one part of the strap 1120 at a time or by having the parts 1122, 1124 of the strap 1120 move in a specific pattern, as determined by a processor 1140, which may have the same configuration as the processor 140 described above. The movement of the parts 1122, 1124 of the strap 1120 may also provoke movement of the housing 1160 to provide an additional different haptic sensation. As described above, different haptic sensations may be delivered that may be translated into different notifications, depending on the location of the actuator in the strap.

In an implementation of embodiments of the invention described above, a wearable smart watch may include a haptic enabled strap. When a text or e-mail message is received by the wearable smart watch, the strap may start to deform and apply haptic effects to the user's wrist to notify the user that the text or e-mail message was received. Different effects may be generated to allow the user to distinguish between a text message and an e-mail message.

The embodiments described herein represent a number of possible implementations and examples and are not intended to necessarily limit the present disclosure to any specific embodiments. Various modifications can be made to these embodiments as would be understood by one of ordinary skill in the art. Any such modifications are intended to be included within the spirit and scope of the present disclosure and protected by the following claims.

What is claimed is:

1. A system, comprising:
   a wearable electronic device;
   a strap, operatively connected to the wearable electronic device, to allow a user to wear the wearable electronic device on a body part;
   an actuator connected to the strap; and
   a processor, in signal communication with the wearable electronic device and the actuator, configured to:
      receive an input signal including directional information,
      determine an output signal, based on the directional information, to generate a haptic effect that conveys the directional information to the user, and
      send the output signal to the actuator to provide the haptic effect to the user through movement of the strap.

2. The system according to claim 1, wherein the actuator comprises a motor operatively connected to a first end of the strap.

3. The system according to claim 2, wherein the motor is operatively connected to a second end of the strap.

4. The system according to claim 2, wherein:
   the actuator comprises a second motor operatively connected to a second end of the strap, and
   the first end of the strap and the second end of the strap are moved independently.

5. The system according to claim 1, wherein the actuator comprises a linear actuator operatively connected to a first end of the strap.

6. The system according to claim 5, wherein:
   the actuator comprises a second linear actuator operatively connected to a second end of the strap, and
   the first end of the strap and the second end of the strap are moved independently.

7. The system according to claim 1, wherein the actuator comprises a smart material.

8. The system according to claim 7, wherein the smart material is embedded in the strap.

9. The system according to claim 7, wherein the smart material is selected from the group consisting of: a macro-fiber composite, an electro-active polymer, an electrorheological fluid and a magnetorheological fluid.

10. The system according to claim 1, wherein the wearable electronic device is a smart watch.

11. A processor-based method, comprising:
    receiving an input signal including directional information;
    determining an output signal, based on the directional information, to generate a haptic effect that conveys the directional information to a user wearing a wearable electronic device including a strap coupled to an actuator;
    sending the output signal to the actuator to provide the haptic effect to the user through movement of the strap.

12. The processor-based method according to claim 11, wherein said moving the strap comprises moving a first end of the strap with the actuator.

13. The processor-based method according to claim 12, wherein said moving the strap further comprises moving a second end of the strap with the actuator.

14. The processor-based method according to claim 13, wherein the first end of the strap and the second end of the strap are moved independently.

15. The processor-based method according to claim 11, wherein:
    the actuator comprises a first motor operatively connected to a first end of the strap and a second motor operatively connected to a second end of the strap, or
    the actuator comprises a first linear actuator operatively connected to a first end of the strap and a second linear actuator operatively connected to a second end of the strap.

16. A non-transitory computer readable medium having instructions stored thereon, that when executed by a processor, causes the processor to perform a method comprising:
    receiving an input signal including directional information;
    determining an output signal, based on the directional information, to generate a haptic effect that conveys the directional information to a user wearing a wearable electronic device including a strap coupled to an actuator;
    sending the output signal to the actuator to provide the haptic effect to the user through movement of the strap.

17. The non-transitory computer readable medium according to claim 16, wherein said moving the strap comprises moving a first end of the strap with the actuator.

18. The non-transitory computer readable medium according to claim 17, wherein said moving the strap further comprises moving a second end of the strap with the actuator.

19. The non-transitory computer readable medium according to claim 18, wherein the first end of the strap and the second end of the strap are moved independently.

20. The non-transitory computer readable medium according to claim 16, wherein:
    the actuator comprises a first motor operatively connected to a first end of the strap and a second motor operatively connected to a second end of the strap, or
    the actuator comprises a first linear actuator operatively connected to a first end of the strap and a second linear actuator operatively connected to a second end of the strap.

* * * * *